US009093695B2

(12) United States Patent
Chami et al.

(10) Patent No.: US 9,093,695 B2
(45) Date of Patent: Jul. 28, 2015

(54) HIGH-POWER LITHIUM-ION STORAGE BATTERY

(71) Applicant: COMMISSARIAT A L'ENERGIE ATOMIQUE ET AUX ENERGIES ALTERNATIVES, Paris (FR)

(72) Inventors: Marianne Chami, Fontaine (FR); Sebastien Martinet, Saint Quentin sur Isere (FR); Florence Masse, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 14/242,293

(22) Filed: Apr. 1, 2014

(65) Prior Publication Data

US 2014/0242465 A1    Aug. 28, 2014

Related U.S. Application Data

(63) Continuation of application No. 13/520,326, filed as application No. PCT/FR2011/000106 on Feb. 21, 2011, now abandoned.

(30) Foreign Application Priority Data

Feb. 25, 2010   (FR) ..................... 10 00775

(51) Int. Cl.
H01M 2/18    (2006.01)
H01M 2/16    (2006.01)
(Continued)

(52) U.S. Cl.
CPC ............... *H01M 2/18* (2013.01); *H01M 2/162* (2013.01); *H01M 2/1606* (2013.01); *H01M 2/1613* (2013.01); *H01M 2/1626* (2013.01); *H01M 2/1633* (2013.01); *H01M 4/5825* (2013.01); *H01M 10/0525* (2013.01);
(Continued)

(58) Field of Classification Search
None
See application file for complete search history.

(56) References Cited

U.S. PATENT DOCUMENTS

2005/0186481 A1*   8/2005  Ogawa et al. ................. 429/332
2006/0068282 A1    3/2006  Kishi et al.
(Continued)

FOREIGN PATENT DOCUMENTS

WO    WO 2009/066916 A2    5/2009

OTHER PUBLICATIONS

Franger et al.; "Optimized Lithium Iron Phosphate for High-Rate Electrochemical Applications;" *Journal of the Electrochemical Society*; 2004; pp. A1024-A1027; vol. 151, No. 7.
(Continued)

*Primary Examiner* — Miriam Stagg
*Assistant Examiner* — Carmen Lyles-Irving
(74) *Attorney, Agent, or Firm* — Oliff PLC

(57) ABSTRACT

A lithium-ion storage battery includes $LiFePO_4$ as an active material for a positive electrode, an active material for a negative electrode having a lithium insertion/extraction potential equal to or greater than 0.5 V vs. $Li^+/Li$, and a separating element placed between the positive and negative electrodes. The active material for the negative electrode is a lithiated titanium oxide, a derivative of a lithiated titanium oxide, a non lithiated titanium oxide, a derivative of a non lithiated titanium oxide or a mixture thereof. The separating element is formed from a non-woven fabric comprising cellulose fibers or glass fibers of nanometric and/or micrometric size.

6 Claims, 3 Drawing Sheets

(51) Int. Cl.
  *H01M 4/58* (2010.01)
  *H01M 10/0525* (2010.01)
  *H01M 2/14* (2006.01)

(52) U.S. Cl.
  CPC ............... *H01M 2/14* (2013.01); *Y02E 60/122* (2013.01); *Y02T 10/7011* (2013.01)

(56) References Cited

U.S. PATENT DOCUMENTS

2006/0115737 A1* 6/2006 Yoshida et al. ............... 429/247
2007/0231702 A1* 10/2007 Fujita et al. .................. 429/247
2009/0081534 A1 3/2009 Takami et al.
2009/0148759 A1 6/2009 Mitsuda et al.
2011/0081583 A1 4/2011 Sugimoto et al.

OTHER PUBLICATIONS

Prosini et al.; "A novel intrinsically porous separator for self-standing lithium-ion batteries;" *Electrochemica Acta*; 2002; pp. 227-233; vol. 48.
International Search Report dated Jun. 20, 2011 for International Application No. PCT/FR2011/000106 (with translation).
http://www.kidoshi.co.jp/english/0301_-_product_02.htm published in 2006.
Jun. 1, 2012, International Preliminary Report on Patentability cited in PCT/FR2011/000106 (with English translation).

* cited by examiner

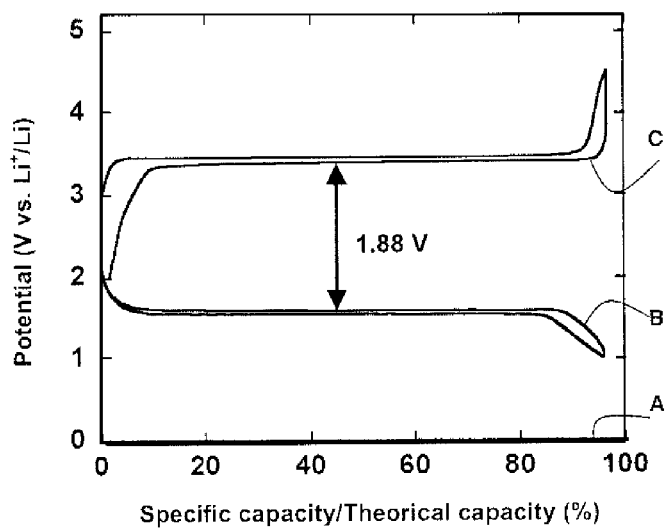
Figure 1 (Anterior Art)
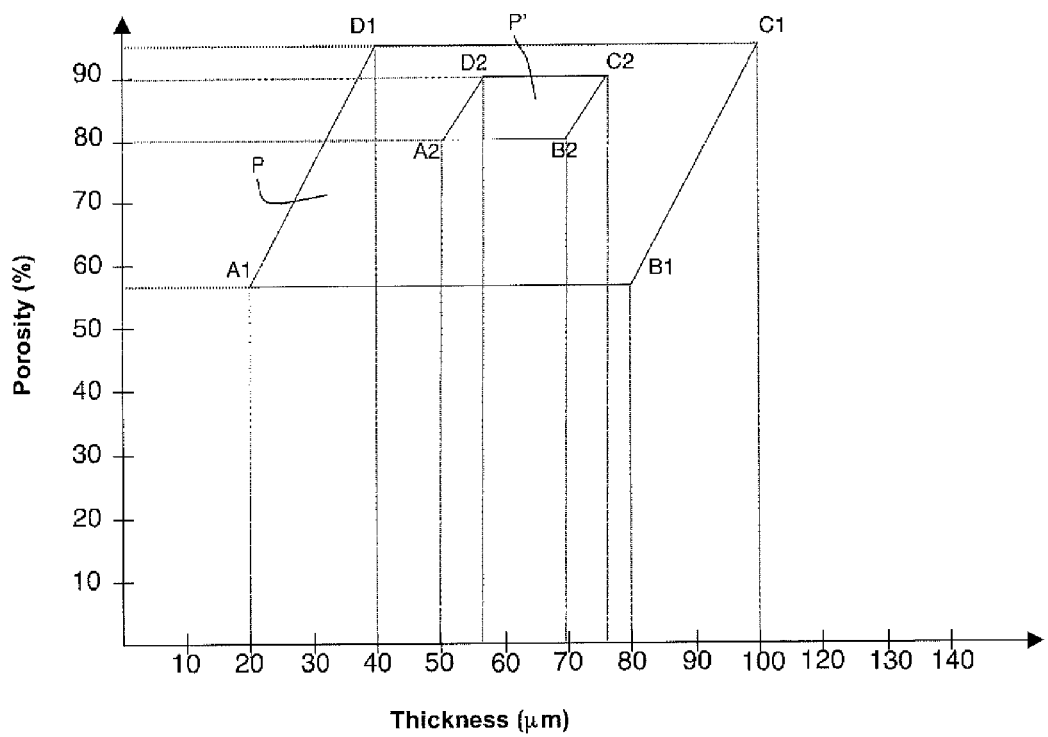
Figure 2

HIGH-POWER LITHIUM-ION STORAGE BATTERY

This is a Continuation of application Ser. No. 13/520,326 filed Jul. 2, 2012, which in turn is a National Stage of PCT/FR2011/000106, filed Feb. 21, 2011. The disclosure of the prior applications is hereby incorporated by reference herein in its entirety.

TECHNICAL FIELD OF THE INVENTION

The invention relates to a Lithium-Ion storage battery.

STATE OF THE ART

Lithium-Ion technology, marketed in 1990, is currently widely used in the field of mobile applications (mobile telephony, laptops, . . . ), where it gradually replaces the cadmium/nickel (NiCd) batteries and the nickel/metal hydride (NiMH) batteries. This evolution is explained by the continuous improvement of the performance of the lithium batteries, thus providing them with mass and volume energy densities definitely higher than those proposed by the NiCd and NiMH ones.

Contrary to the negative electrode of a Lithium-Metal storage battery, the negative electrode of a Lithium-Ion (also called Li-Ion) storage battery is not a source of lithium for the positive electrode. Thus, in a Lithium-Ion system, the negative electrode generally comprises an active material formed by a lithium intercalation or insertion material, such as graphite carbon, and lithium comes from the active material of the positive electrode. The Li+ cations then moves back and forth between the electrodes, respectively negative and positive, for each charge and discharge of the battery. Thus, lithium is never in a metal form in a Li-Ion storage battery.

The currently marketed Li-Ion technology is based on the reversible intercalation of lithium coming from an active material of the positive electrode into the graphite material forming the active material of the negative electrode. The active material of the positive electrode is generally a lamellar oxide of $LiCoO_2$, $LiNiO_2$ type and the mixed oxides $Li(Ni, Co, Mn, Al)O_2$ or a spinel-structured compound with a composition close to $LiMn_2O_4$.

This Li-Ion system, and in particular the system containing lamellar oxide and graphite, is now perfected for mobile applications. However, it is not adapted to applications with definitely more important energy needs, such as electric or hybrid vehicles, stationary applications and renewable energies. Indeed, active materials and in particular lamellar oxides are very onerous and create problems of safety because lamellar phases and graphite are relatively unstable, respectively at the charged state and discharged state. Moreover, the use of graphite as active material for the negative electrode imposes limits on current density, in particular at the end of the charging process. Indeed, the graphite material of the negative electrode in Li-Ion storage batteries has an operating potential (~100 mV vs. $Li^+/Li$) very close to that of the lithium metal deposition. Thus, lithium dendrites can be formed occasionally, which is likely to cause short-circuits and explosion, all the more that the current density is high and that a constant current is maintained at the end of the charging process.

Recent developments of electrode materials propose to replace the graphite material of the negative electrode by lithiated titanium oxide $Li_4Ti_5O_{12}$. The lithium insertion/extraction reaction in the couple $Li_4Ti_5O_{12}/Li_7Ti_5O_{12}$ is as follows:

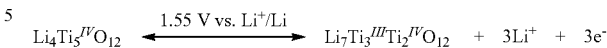

This is a two-phase reaction, i.e. it has an insertion/extraction potential which is constant compared to the insertion/extraction potential of $Li^+/Li$ couple. The insertion/extraction potential for a material relative to the insertion/extraction potential of the $Li^+/Li$ couple is also called, in a simplified way, lithium insertion/extraction potential or electrode operating potential. As represented in FIG. 1, the lithium insertion/extraction potential of the couple $Li_4Ti_5O_{12}/Li_7Ti_5O_{12}$ (Curve B) is equal to 1.55 Volts compared to the insertion/extraction potential for the $Li^+/Li$ couple (Curve A), that is to say 1.55 V vs. $Li^+/Li$. Such a potential makes it possible to be freed from the risk of dendrite formation. Moreover, the compound $Li_4Ti_5O_{12}$ allows the reversible insertion of three moles of lithium ions, at said potential. Moreover, $Li_4Ti_5O_{12}$ has a great chemical and thermal stability, it is not toxic and has a great electrochemical effectiveness. In addition, the titanium chemistry allows the elaboration of a whole range of $Li_4Ti_5O_{12}$ morphologies (texture, size . . . ), in particular of nanometric size. This can allow a fast insertion/extraction, therefore a use for power applications. Thus, $Li_4Ti_5O_{12}$ is a material able to replace graphite as material for negative electrode in certain applications in particular those related to electric or hybrid transport as well as intermittent stationary storage.

Developments are also underway regarding active material for positive electrode. Thus, lithiated iron phosphate $LiFePO_4$, with an olivine structure, has been regarded for a few years as a prime material for a positive electrode for some new applications, such as hybrid cars, portable tools or photovoltaic systems. The extraction of lithium from $LiFePO_4$ is carried out according to the following two-phase and reversible process:

The specific capacity of the material is of 170 mAh/g with a lithium insertion/extraction potential of 3.4 V vs. $Li^+/Li$ (curve C in FIG. 1). The theoretical mass energy density of $LiFePO_4$, which corresponds to the specific capacity value multiplied by the value of the lithium insertion/extraction potential of the couple $LiFePO_4/FePO_4$ (that is to say 3.43 V vs. $Li^+/Li$), is about 580 Wh/kg and it is thus higher than the practical value obtained with $LiCoO_2$ and other commercial lamellar oxides (typically 530 Wh/kg). Thus, this compound can be regarded as a possible alternative to $LiCoO_2$ and its derivatives on the Li-Ion battery market. Moreover, it is possible to practically reach the theoretical performance, in particular when carrying out a particular coating of the $LiFePO_4$ particles, which is a relatively bad electronic conductor, with carbon so as to obtain a composite material $LiFePO_4/C$. Thus, the use of $LiFePO_4$ in a lithium battery proves to be strongly interesting not only thanks to the intrinsic performance of $LiFePO_4$ material but also thanks to its great thermal and chemical stability, its low toxicity and its moderate cost compared to that of cobalt or nickel compounds for example.

There is thus a strong craze for the couple $LiFePO_4/Li_4Ti_5O_{12}$ because of the intrinsic performance of the two compounds. Thus, the association of a LiFePO$_4$-based positive electrode and a Li$_4$Ti$_5$O$_{12}$-based negative electrode, was reported for example in the article "Optimized Lithium Iron Phosphate for High-Rate Electrochemical Applications" (Journal of The Electrochemical Society, 151(7) A1024-A1027 (2004)) by S. Franger et al. This type of Li-Ion battery is indeed very interesting in that it uses materials that are nontoxic, strong in particular with an extended lifespan, stable and able to work with high currents and with moderated losses of capacity compared to a cycle with low current densities.

In addition, in Li-Ion batteries, the electrolyte is usually made of at least one very stable lithium salt, such as LiPF$_6$, dissolved in one or more organic solvents with a wide potential window (i.e. a potential between 0 to 4.1 V vs. Li$^+$/Li). Such a liquid electrolyte impregnates a separating element, arranged between the positive and negative electrodes. In a traditional way, the separating element is a microporous sheet with a very fine thickness (thickness typically lower than 25 microns), containing at least one polymeric material of the polyolefin family, such as polypropylene (PP), polyethylene (PE) or a mixture thereof. The most used separating elements are those marketed by the Celgard company, such as the range of one-layer separators PP Celgard®, the range of one-layer separators PE Celgard® and the range of three-layer separators PP/PE/PP Celgard®.

Such separating elements has especially been favored because their small thickness makes it possible to limit the distance between the positive and negative electrodes and thus to compensate for the relative bad conductivity of the Li+ ions in the organic solvent(s) used for the liquid electrolyte, in comparison with aqueous electrolytes. Moreover, such separating elements have a sufficient tortuosity and porosity for preventing the electrodes from being short-circuited, via the formation of dendrites at the negative electrode, when the latter is made out of graphite carbon.

Thus, in a traditional way, in the article of S. Franger et al., the couple LiFePO$_4$/Li$_4$Ti$_5$O$_{12}$ was associated with a separator formed by a separator composed of a one-layer separating element of polypropylene, impregnated with an electrolyte made up of a 1M solution of LiPF$_6$ in a mixture of ethylene carbonate (EC) and dimethyl carbonate (DMC), with a volume ratio of 1:1.

However, PP- and/or PE-based separating elements, such as those of the Celgard® range, have a porosity lower than or equal to 55%. Moreover, the polymers PE and PP are polymers sensitive to high temperatures. In particular, they are degraded respectively from 115° C. (melting point of PE is comprised between approximately 125° C. and 135° C.) and from 130° C. (melting point of PP lies between approximately 160° C. and 165° C.). However, this sensitivity of the polymers PP and PE to temperatures higher than 130° C. can be totally unacceptable in some extreme applications. There is, moreover, a risk of degradation of the separating element during the thermo-sealing operation carried out at a temperature higher than 130° C., during the final packing of the battery. Lastly, for polyethylene-containing separating elements, the choice of the material couple used as active materials for the negative and positive electrodes in the lithium battery is limited by the lithium insertion and extraction potential of said materials, because PE oxidizes when it is subjected to a tension higher than or equal to 4.2 V.

In the article "A novel intrinsically porous separator for self-standing lithium ion batteries" of Pier Paolo Prosini and Al (Electrochimica Acta 48 (2002) 227-233), the authors propose a separating element which is intrinsically porous, self-supported and likely to be hot laminated under pressure without losing its capacity of being impregnated with a liquid electrolyte. The separating element is formed by a composite material including a polymeric matrix comprising the copolymer poly(vinylidene fluoride-hexafluoropropylene), also noted PVdF-HFP, fillers of inorganic oxide, such as LiAlO$_2$, Al$_2$O$_3$ or MgO. Moreover, it is impregnated with a 1M solution of LiPF$_6$ in a mixture with 1:1 of EC/DMC and it is used with the couple LiMn$_2$O$_4$/graphite carbon respectively for the cathodic active material and the anodic active material.

OBJECT OF THE INVENTION

The object of the invention is to propose a Li/Ion storage battery, able to output a very high power while being inexpensive, in particular so that it can be used in applications related to electric or hybrid transport or to the intermittent storage of energy.

According to the invention, this object is reached by the annexed claims.

BRIEF DESCRIPTION OF THE DRAWINGS

Other advantages and characteristics will more clearly arise from the following description of particular embodiments of the invention given as nonrestrictive examples and represented in the annexed drawings in which:

FIG. 1 represents the potential curves as a function of the specific capacity and the theoretical capacity (charging/discharging rate equivalent to C/5) of a Lithium/Metal battery including a positive electrode respectively containing Li (Curve A), Li$_4$Ti$_5$O$_{12}$ (Curve B) and LiFePO$_4$ (Curve C);

FIG. 2 graphically represents the porosity and thickness regions advantageously selected for a separating element according to the invention;

DESCRIPTION OF PARTICULAR EMBODIMENTS

Figure 3:
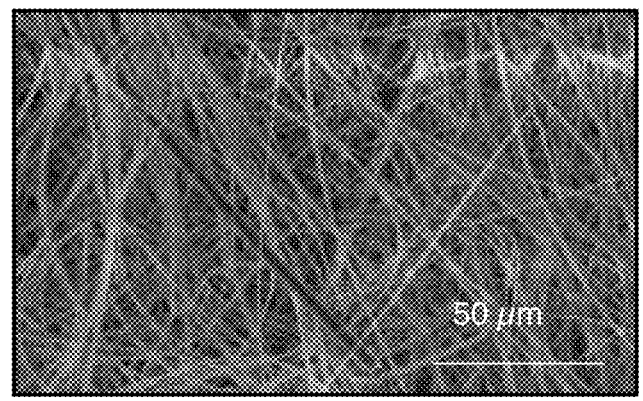
FIG. 3 represents a picture obtained by electron scanning microscopy of a non-woven fabric containing glass fibers.

According to a particular embodiment, it is proposed to associate the couple of active materials LiFePO$_4$/Li$_4$Ti$_5$O$_{12}$ forming the respective active materials of the positive and negative electrodes with a particular separating element, formed by a fiber-based non-woven fabric.

Such an association makes it possible, indeed, to obtain a Li-Ion storage battery able to output a very high power while being inexpensive.

By definition, a non-woven fabric is a manufactured sheet, made up of a veil or layer of fibers oriented in a particular direction or randomly, bound by friction and/or cohesion and/or adhesion, with the exclusion of paper and products obtained by weaving, knitting . . . .

Moreover, the fibers are microfibres and/or nanofibres, i.e. fibers of micrometric size (microfibres) and/or nanometric (nanofibres). By micrometric dimensions, it is understood the dimensions between 0.5 µm and 10 µm and advantageously of about 1 µm and by nanometric dimensions, it is understood the dimensions between 1 nm and 100 nm and advantageously of about ten nanometers.

Lastly, fibers are selected so as to be:
electrically insulating,
chemically stable with respect to the components of the liquid electrolyte used and in particular with respect to carbonated solvents used,
stable also with respect to active materials used for the positive and negative electrodes, and
thermically stable in the range of the operating temperatures of the battery (generally between −20° C. to +60° C.).

The fibers are, more particularly, selected among cellulose fibers and glass fibers.

The glass fibers are, in particular, fibers formed from one or more amorphous materials, advantageously in the form of oxides such as $SiO_2$, $Al_2O_3$, CaO, MgO, $Na_2O_3$, . . . .

In a preferred way, the separator is a non-woven fabric made up of glass fibers or cellulose fibers, of micrometric and/or nanometric size.

In addition, the separating element has, advantageously, a porosity, i.e. a percentage of empty volume compared to the total volume of the separating element, between 56% and 95% and advantageously between 80% and 90% included.

In order to provide the separating element in the Li-Ion battery with a satisfactory mechanical behavior, a good compromise between the thickness and the porosity of said separating element is usually necessary. Thus, according to the mutual tangle of the fibers, and for power applications, the thickness of the separating element formed by a non-woven fabric preferably varies between approximately 20 µm for a porosity of 56% and approximately 100 µm for a porosity of 95%. More particularly, the thickness and the porosity are advantageously selected so as to be in a range P of values, represented in FIG. 2 in the shape of a parallelogram delimited by the points A1, B1, C1 and D1 and whose coordinates are respectively:
A1: a porosity of 56% for approximately 20 µm
B1: a porosity of 56% for approximately 80 µm
C1: a porosity of 95% for approximately 100 µm
D1: a porosity of 95% for approximately 40 µm.

Still more advantageously, the thickness and the porosity are advantageously selected so as to be in a preferential range P' of values, represented in FIG. 2 in the shape of a parallelogram delimited by the points A2, B2, C2 and D2 whose coordinates are respectively:
A2: a porosity of 80% for approximately 50 µm
B2: a porosity of 80% for approximately 70 µm
C2: a porosity of 90% for approximately 56 µm
D2: a porosity of 90% for approximately 76 µm.

Moreover, because of its non-woven fabric structure containing fibers of micrometric and/or nanometric size, the separating element has a very good capacity of impregnation with the liquid electrolyte. In particular, this capacity of impregnation can be characterized by measuring the time (called time of impregnation) elapsed between the initial instant when a drop of electrolyte is deposited onto the surface of the separating element (initial contact angle θ at t=0 corresponding to the wettability of said surface with the liquid electrolyte) and the instant when said contact angle θ tends towards zero, because of the impregnation of the non-woven fabric with said drop. In the case of non-woven fabrics containing microfibres and/or nanofibres, the time of impregnation is lower than or equal to 1 second, which characterizes the very good capacity of impregnation of the non-woven fabric with respect to the liquid electrolyte.

Lastly, the non-woven fabric structure containing fibers of micrometric and/or nanometric size allows the separating element to be compressible. This characteristic is particularly advantageous to improve the contact between the separating element and each electrode, in particular when these electrodes have deformations or irregularities. In particular, this is interesting in the case of bipolar Li-Ion batteries for which the electrodes have undulations or deformations after calendering.

As an example, a non-woven fabric containing glass microfibres, of C type used as separating element for a Li-Ion battery, is illustrated in FIG. 3. It has a porosity of 90% and a thickness of 76 µm and the microfibres have dimensions varying between 0.1 µm to 10 µm. Moreover, the non-woven fabric is compressible by half.

It was interposed between two strips respectively forming the positive electrode and the negative electrode and the whole forms a Li-Ion battery of a button type. The strip for each electrode is obtained for example from a mixture (or ink) including the active material ($LiFePO_4$ for the positive electrode and $Li_4Ti_5O_{12}$ for the negative electrode) with an electronic conducting additive, such as carbon, and a binder for providing a good ionic conduction and a satisfactory mechanical behavior. The binder can be an organic binder, such as a polyether, a polyester, a methyl-methacrylate-based polymer, acrylonitrile, vinylidene fluoride or a water-soluble compound, such as natural or synthetic rubber. The mass ratios classically used are about 80% for active material, 10% for the electronic conducting additive and 10% for the binder. The obtained mixture is then spread out over an aluminum foil used as a current collector and dried to evaporate residual solvents before the obtained electrode is hot calendered (for example at 80° C.) in order to obtain the porosity necessary for an optimal operation of the Li-Ion battery.

Contrary to the couple of active materials $LiCoO_2$/C which can involve dendrites formation and thus create short-circuits via the separating element, using the couple of active materials $LiFePO_4/Li_4Ti_5O_{12}$ for forming the Li-Ion battery ensures the safety of said battery. Moreover, such a couple can be associated with a separating element formed by a non-woven fabric with a very high porosity.

In addition, the expenses for producing such a storage battery are reduced because the material $LiFePO_4$ is regarded as a low cost material in comparison with lamellar oxides. Moreover, a $Li_4Ti_5O_{12}$-based electrode is less expensive than a graphite electrode because it is possible, with $Li_4Ti_5O_{12}$, to use a current collector made of aluminum instead of copper. Lastly, the method for manufacturing a non-woven fabric containing cellulose or glass fibers is less expensive than that for manufacturing microporous elements containing polyolefins such as those currently marketed, which require in certain cases the scaling of three sheets with micrometric thicknesses, before stretching.

Figure 4:
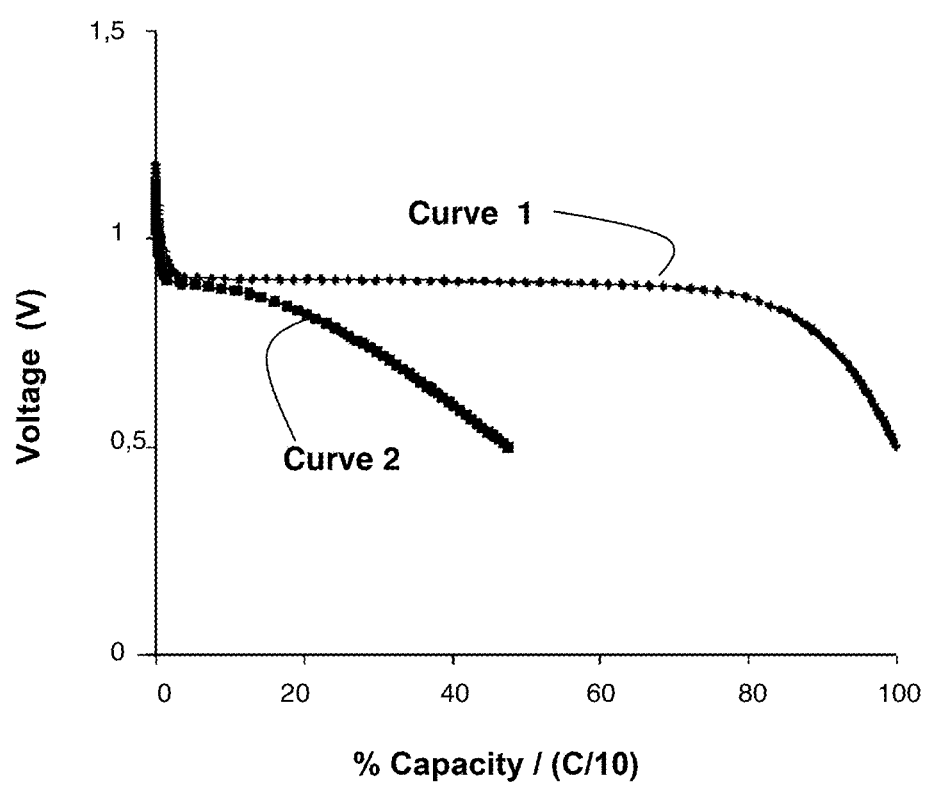
FIG. 4 represents the evolution of the operating voltage of a Li-Ion battery based on the active materials couple LiFePO$_4$/Li$_4$Ti$_5$O$_{12}$, as a function of the capacity percentage at C/10 cycle rate, with two different separators, one marketed by the Celgard company under the reference C480 (three-layers PP/EP/PP) (curve 2), the other formed of a non-woven fabric containing glass fibers (curve 1)

As an example, FIG. 4 illustrates the performances of two Li-Ion storage batteries, each of them including the couple of active materials $LiFePO_4/Li_4Ti_5O_{12}$ and intended to be used in applications for hybrid transport (HEV), on a scale of 1 to 4, and having a capacity of 150 mAh. The separating element is in one case (Curve 1) a non-woven fabric made of glass microfibres with a thickness of 76 µm and a porosity of about 90% and, in the other case (Curve 2), it is a separator marketed by the Celgard company under the reference C480 (three-layers PP/PE/PP) with a thickness of 21.5 µm and a porosity of 50%. In both cases, the lithium batteries are cycled at a C/10 rate at 20° C. and the electrolyte used is a mixture of organic solvents EC/PC/DMC (ratio 1:1:1) in which 1M of LiBETi (Lithium bis(perfluorosulfonyl)imide or LiN $(C_2F_5SO_2)_2$ is dissolved. The impregnation surface of the separating elements is about 150 cm².

Thus, whereas no impregnation precaution is used to improve the impregnation of the two separating elements, one observes, by comparing curves 1 and 2, that the excellent wettability of the separating element formed by a non-woven fabric containing glass microfibres makes it possible to obtain (contrary to the commercial separators) all the capacity of the battery at a C/10 rate. This characteristic then makes it possible to be freed from the steps necessary to the impregnation of the marketed separators (in particular, carrying out several cycles during which the lithium battery is under vacuum).

Figure 5:
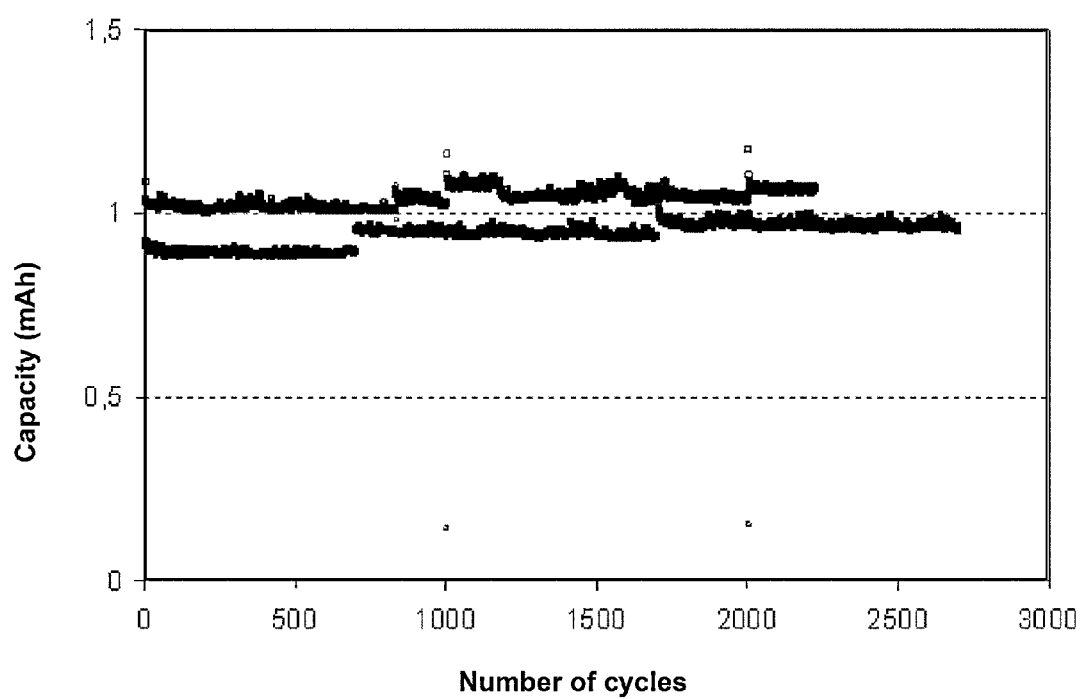
FIG. 5 represents the evolution of the capacity of a Li-Ion battery according to the invention according to the number of cycles.

Moreover, as illustrated in FIG. 5, a Li-Ion battery of the button type, cycled at an accelerated rate (5C), has, with the couple $LiFePO_4/Li_4Ti_5O_{12}$ and a separating element made of a non-woven fabric containing glass microfibres, a stable performance. The electrolyte used is a mixture of organic solvents EC/PC/DMC (ratio 1:1:1) in which 1M of LiBETi (Lithium bis(perfluorosulfonyl)imide) or $LiN(C_2F_5SO_2)_2$ is dissolved. In addition, it is noted that the performance of the pile is stable on more than 2000 cycles and that no dendrite is formed during the test operation (doubled) on more than 2500 cycles.

It should be noted that, within the framework of the invention, $Li_4Ti_5O_{12}$ can be replaced by another active material for the negative electrode with a lithium insertion/extraction potential equal to or greater than 0.5 V vs. Li⁺/Li, chosen among another lithiated oxide titanium, a lithiated titanium oxide derivative, a non lithiated titanium oxide, such as $TiO_2$ and a derivative of a non lithiated titanium oxide. By derived from lithiated titanium oxide, it is understood compounds of the formula $Li_{(4-x)}M_xTi_5O_{12}$ and $Li_4Ti_{(5-y)}N_yO_{12}$, where x and y respectively are between 0 and 0.2 and M and N are respectively chemical elements chosen among Na, K, Mg, Nb, Al, Ni, Co, Zr, Cr, Mn, Fe, Cu, Zn, Si and Mo. By derived from non lithiated titanium oxide it is understood compounds of the formula $Ti_{(5-y)}N_yO_{12}$, where y is between 0 and 0.2 and N is a chemical element selected among Na, K, Mg, Nb, Al, Ni, Co, Zr, Cr, Mn, Fe, Cu, Zn, Si and Mo. $Li_4Ti_5O_{12}$ can also be replaced by a mixture of several compounds: lithiated or non lithiated titanium oxides and/or derivatives of lithiated or non lithiated titanium oxide.

What is claimed is:

1. A lithium-ion storage battery comprising:
   $LiFePO_4$ as an active material for a positive electrode;
   an active material for a negative electrode having a lithium insertion/extraction potential equal to or greater than 0.5 V vs. Li⁺/Li, the active material for the negative electrode being a lithiated titanium oxide, a derivative of a lithiated titanium oxide, a non lithiated titanium oxide, a derivative of a non lithiated titanium oxide or a mixture thereof; and
   a separating element placed between the positive and negative electrodes, the separating element being formed from a non-woven fabric comprising cellulose fibers or glass fibers of nanometric and/or micrometric size,
   wherein the non-woven fabric has a porosity and a thickness included in a parallelogram A2B2C2D2 defined by the following coordinates:
   A2 a porosity of 80% by volume at a thickness of approximately 50 μm;
   B2: a porosity of 80% by volume at a thickness of approximately 70 μm;
   C2: a porosity of 90% by volume at a thickness of approximately 56 μm; and
   D2: a porosity of 90% by volume at a thickness of approximately 76 μm, and
   wherein the non-woven fabric has a thickness of 56 μm to 76 μm and a porosity of 80% to 90% by volume.

2. The battery according to claim 1, wherein the non-woven fabric comprises glass fibers of nanometric and/or micrometric size.

3. The battery according to claim 1, wherein the non-woven fabric comprises cellulose fibers of nanometric and/or micrometric size.

4. The battery according to claim 1, wherein the active material for the negative electrode is $Li_4Ti_5O_{12}$.

5. The battery according to claim 1, wherein the non-woven fabric has a time of impregnation of 1 second or less.

6. The battery according to claim 1, wherein the separating element is compressible.

* * * * *